Nov. 11, 1958 W. C. DUNLAP, JR 2,860,218

GERMANIUM CURRENT CONTROLLING DEVICES

Filed Feb. 4, 1954

INVENTOR.
William C. Dunlap, Jr.,
BY
Paul A. Frank
His Attorney.

United States Patent Office 2,860,218

Patented Nov. 11, 1958

2,860,218

GERMANIUM CURRENT CONTROLLING DEVICES

William C. Dunlap, Jr., Schenectady, N. Y., assignor to General Electric Company, a corporation of New York Application February 4, 1954, Serial No. 408,121

13 Claims. (Cl. 201—63)

My invention relates to germanium electric current controlling devices and more particularly to germanium devices sensitive to heat or light, as well as to asymmetrically conductive devices.

One object of the invention is to provide germanium devices having unusually pronounced "thermoconductive" properties over a range of temperatures from about −100° C. to −200° C., and yet having absolute magnitudes of resistivity over such low temperature range which enable the devices conveniently to serve as thermosensitive control elements of electric circuits capable of distinguishing between operation at adjacent low temperatures, for example, between liquid oxygen and liquid nitrogen temperatures. At lower temperatures, for example, at the temperature of liquid helium, the devices of my invention have much more limited utility because of the unusually high resistivity thereof at such lower temperatures. The term "thermoconductive" property refers to the change in resistivity which the material exhibits with changes in temperature.

Another object of the invention is to provide germanium devices exhibiting unusually pronounced photoconductive properties; in other words, a high degree of change in resistivity level for different intensities of impinging light, and particularly infra-red light, when the devices are maintained at low temperatures, particularly, from −100° C. to −200° C. The absolue magnitudes of the range of resistivity change of these photosensitive germanium devices when subjected to incident light at these low temperatures, enable the devices conveniently to serve as efficient photosensitive control elements for electric circuits and especially to serve as infra-red detectors for long infra-red wavelengths, for example, from 4–10 microns.

Another object of the invention is to provide germanium devices exhibiting useful photoconductive properties over an extremely wide range of temperature, for example, from −200° C. to 70° C.

A further object of the invention is to provide germanium current controlling devices such as resistors, rectifiers, transistors, photosensitive elements, and Hall effect plates, which do not suffer from the disadvantage that the resistivity of the highly purified germanium employed in such devices varies considerably with temperature over their normal operating temperature range. More specifically, it is an object of the invention to provide germanium devices having substantially constant resistivity throughout their normal ambient temperature range from about 0° C. to about 70° C.

In general, semiconductor current controlling devices in accord with the invention are provided in the form of a high purity germanium crystalline body having at least a portion thereof impregnated with a trace of gold but substantially free of all other acceptor activator elements for germanium and having a pair of spaced connections thereto. The germanium body may be impregnated by the fusion and diffusion of a gold contact within the body at an elevated temperature, for example, 500° C., but is preferably impregnated by addition of gold to a germanium melt from which a gold impregnated crystal is grown. The term "trace of gold" is used herein to mean from $10^{13}$ to $10^{15}$ atoms of gold per cubic centimeter of germanium. The term "high purity germanium" is used herein to mean germanium having less than $2\times10^{15}$ atoms of impurities per cubic centimeter of germanium and corresponds to germanium having a resistivity above 1 ohm centimeter at 25° C. The term "substantially free of other acceptor impurities" is used herein to connot germanium having less than $10^{8}$ atoms per cubic centimeter of other conventional acceptor activator materials such as indium or gallium which, even if present in such minute amounts, have negligible effect upon the electrical characteristics of the germanium. Because of the freedom from other acceptor activator impurities, the germanium body is, of course, either N-type or intrinsic before an impregnation with gold. The addition of gold to the high-purity N-type, or intrinsic, germanium greatly enhances the thermoconductive and photoconductive properties of the germanium body at low temperatures and enables the provision of thermocontrol and photocontrol elements suitable for use over this low temperature range. Moreover, if the gold-impregnated germanium body is made with a P–N junction barrier therein, the impedance of this barrier will vary with the intensity of impinging light at room temperatures or even at somewhat higher temperatures with the result that the same germanium device can be used as a photocontrol element of an electric circuit over an unusually wide temperature range such as from −200° C. to 70° C. Furthermore, the addition of gold to a high purity N-type germanium body has the effect of stabilizing the resistivity versus temperature characteristic of the N-type germanium body, and, if added to the body in proper amounts as will be more fully explained hereinafter, provides a germanium body having substantially constant resistivity over its entire normal operating ambient temperature range from 0° C. to 70° C. to enable the provision of improved germanium devices such as resistors, rectifiers, transistors, photocells, and Hall effect plates.

The novel features believed characteristic of the invention are set forth in the appended claims. The invention itself, however, together with further objects and advantages thereof, may best be understood by referring to the following description taken in connection with the accompanying drawing, in which:

Figure 1:
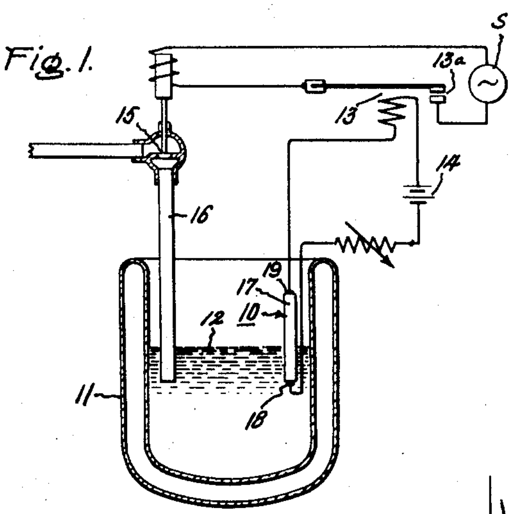
Fig. 1 illustrates a thermoconductive control device embodying the invention and an electric circuit therefor.

Referring to Fig. 1, the invention is shown in one form as a thermoconductive element 10 connected in a suitable circuit for measuring or monitoring the level of liquid within an insulated vessel 11 containing a liquefied gas 12 such as liquid oxygen or liquid nitrogen. Thermoconductive element 10 is connected in series with the coil of an electromagnetic switch 13 and an alternating or direct current source shown as battery 14. The contacts 13*a* of switch 13 are connected in series with an alternating voltage power source S and the coil of an electromagnetically controlled fluid valve 15 arranged to control the flow of liquid oxygen or liquid nitrogen through a conduit 16 into vessel 11 by being opened when energized and closed when de-energized. Thermoconductive element 10 comprises a high purity germanium crystalline bar 11 impregnated with a trace of gold but substantially free of all other acceptor impurities and a pair of low resistance connections 18 and 19 to opposite ends of bar 17. Germanium bar 17 is preferably monocrystalline and may conveniently be ½ inch long and 1⁄16 inch wide and thick. The germanium bar 17 is preferably substantially free not only of the acceptor impurities but of all electrically significant impurities other than gold. However, donor impurities such as antimony or arsenic to the extent of about $10^{15}$ atoms of such impurities corresponding to about 1 ohm centimeter resistivity N-type germanium material at 25° C. may be present before the addition of gold. The gold is incorporated in the germanium in relatively minute amounts also preferably less than $10^{15}$ atoms of gold per cubic centimeter of germanium. The total impurity content of both gold and other significant impurities in the germanium should thus not exceed $2\times10^{15}$ atoms of impurities per cubic centimeter of germanium. If the gold content predominates, the germanium bar 17 will normally be P-type while, if the donor activator content predominates, the bar 17 will normally be N-type ranging from intrinsic or high resistivity (about 30 ohm centimeters at 25° C.) N-type germanium where the donor content is almost the same as the gold content to low resistivity (about 1 ohm centimeter at 25° C.) N-type germanium where the donor content is about twice the gold content.

Germanium bar 17 may be easily provided by extraction from a monocrystalline ingot grown by seed crystal withdrawal during solidification from a melt of high purity initially N-type germanium material having a solidified resistivity above 1 ohm centimeter at 25° C., to which has been added from 0.005 to 0.1% of pure gold. The technique of growing a monocrystalline germanium ingot by seed crystal withdrawal is now well-known in the art and is described in several publications, for example, an article entitled "Preparation of Germanium Single Crystals" by Roth and Taylor in the Proceedings of the I. R. E., vol. 40, pages 1338 to 1341, November 1952. Because of the low segregation coefficient of gold relative to germanium (about $1.5\times10^{-5}$), less than $10^{15}$ atoms per cubic centimeter of gold will be assimilated by the growing germanium ingot. Even additions of minute traces of gold corresponding, for example, to the presence of $10^{13}$ atoms of gold per cubic centimeter of germanium appear to have pronounced effect and enhancement of the thermoconductive properties of the germanium material.

In general, it may be stated that the greater the purity of the germanium in bar 17, the less the amount of gold that is necessary to produce the same enhancement of the thermoconductive properties. For example, only 5 to 10 milligrams of gold need be added for each 100 grams of germanium having a purity corresponding to a resistivity above 30 ohm centimeters at 25° C. Germanium of this purity may be considered intrinsic germanium. A germanium ingot grown by seed crystal withdrawal from this latter alloy melt will have substantially the same desirable thermoconductive properties at low temperatures as an initially less pure germanium melt impregnated with a heavier concentration, for example, 100 milligrams of gold for each 100 grams of germanium.

Where the gold impregnation of germanium bar 17 converts the bar to P-type conductivity material, low resistance contact connections 18 and 19 preferably comprise an acceptor activator element for germanium, for example indium, in order to remove the possibility of rectifier barriers beneath the contacts. If contacts 18 and 19 are indium, they may be fused to the germanium bar 17 at temperatures of the order of 400° C. and the connecting wires are preferably soldered to the indium contacts 18 and 19 during the same heating step in which the contacts are fused to the germanium bar 17. If germanium bar 17 remains N-type despite the addition of gold, then contacts 18 and 19 preferably comprise a donor activator element such as antimony which may be fused to the germanium bar 17 at about 650° C. Very low resistance connections are thus provided to thermoconductive germanium bar 17.

Figure 2:
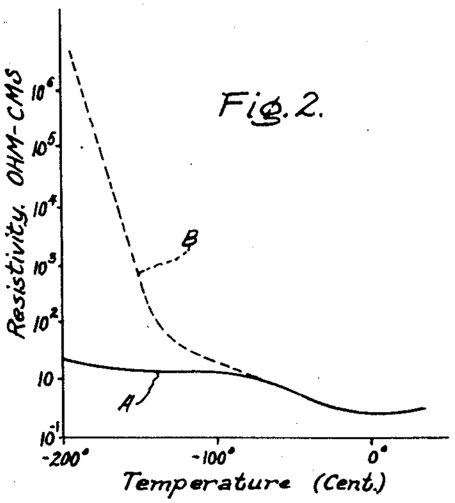
Fig. 2 is a group of curves illustrating the improvement in thermoconductive properties resulting from the presence of gold in the thermoconductive device of Fig. 1.

The enhancement of the thermoconductive properties of germanium bar 17 resulting from the impregnation thereof with gold is illustrated by the curves of Fig. 2. In Fig. 2, curve A is a plot of the resistivity vesus temperature of a germanium bar extracted from a portion of an ingot grown from a melt of high purity N-type germanium before the addition of gold to the melt. Curve B, on the other hand, is a plot of the resistivity versus temperature curve of a germanium bar extracted from a portion of the same ingot grown from the same germanium melt after approximately 50 milligrams of gold were added for each 100 grams of germanium in the melt. As can be seen from these curves, the N-type germanium bar extracted from the portion grown before gold was added to the melt exhibits little change in resistivity over the temperature range from —100° C. to —200° C. while the sample extracted from the gold-impregnated portion of the ingot has P-type conductivity and exhibits a very sharp increase in resistivity for decreases in temperature over this temperature range. As can be seen from the slope of curve B the resistivity of the gold impregnated germanium bar 17 varies from a few hundred ohms to 50 megohms in the temperature range from —100° C. to —200° C. This range of resistivity change lends itself admirably to the control of electric currents. By selecting a load 13 in the circuit of bar 17 having approximately the same order of resistance or impedance magnitude as that of germanium bar 17 over the range of temperatures to be measured or monitored by the thermoconductive device 10, the change in resistance of the thermoconductive device as a result of any change in temperature thereof immediately appears as a considerable change in current through the load. In the device of Fig. 1, a decrease in the level of liquid 12 increases the overall temperature of bar 17, thereby decreasing the resistance of the bar and permitting a greater current to flow through the coil of electromagnetic switch 13. At a predetermined temperature of bar 17, the current is sufficient to close the contacts 13*a* of switch 13 and energize the coil of electromagnetically controlled fluid valve 15, thereby to open valve 15 and allow more liquid to flow into vessel 11 until the overall temperature of bar 17 is decreased and its resistance increased sufficiently to deenergize switch 13 and close valve 15.

Figures 3, 5, 6:
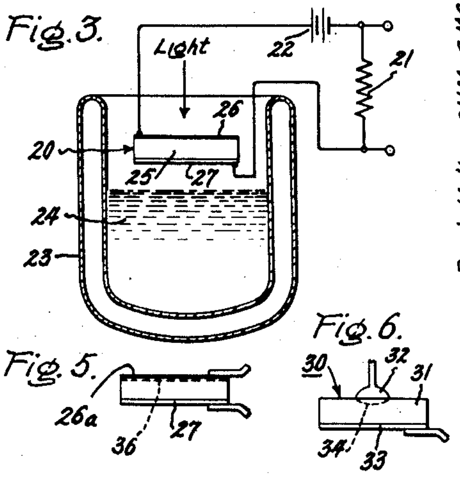
Fig. 3 illustrates a photoconductive control device embodying the invention and an electric circuit therefor.
Fig. 5 illustrates another photosensitive control device which may be substituted for the device of Fig. 3 especially for wider temperature operation.
Fig. 6 illustrates a rectifier embodying the invention.

Referring now to Fig. 3, I have shown a photoconductive cell 20 embodying the invention and connected in a suitable electrical circuit comprising output resistor 21 and a battery 22. Photoconductive cell 20 is maintained at a desired low temperature by immersion within an insulated vessel 23 containing a liquefied gas 24, such as liquid air. Photoconductive cell 20 comprises a germanium crystalline wafer 25 which may conveniently be a rectangular wafer ½ inch long and wide, and about 50 mils thick. The photoconductive device 20 contains electrodes 26 and 27 covering the opposite major surfaces of the germanium wafer 25. The upper electrode layer 26 is quite thin, less than 0.001" thick, and preferably less than 0.0001" thick in order that incident light rays will penetrate completely through the electrode layer and activate the germanium wafer 25. The lower layer 27 may be much thicker if desired. Both electrodes 26 and 27 may comprise metals which make low resistance connection to germanium wafer 25 or one of the electrodes 26 may comprise a metal which makes an asymmetrically conducting or P–N junction connection with wafer 25. Where cell 20 is intended for operation only at low temperatures from −100° C. to −200° C., it is preferable, though not essential, that wafer 25 contain no P–N junctions and that electrodes 26 and 27 make low resistance connections to the wafer 25. Where cell 20 is intended for operation at higher temperatures from −100° C. to 70° C., or for operation over the unusually wide temperature range from −200° C. to 70° C., it is important that one electrode make a rectifying connection or that wafer 25 contain a P–N junction 36, for example, as illustrated in Fig. 5. For this purpose, one of the electrodes, such as electrode 26*a* of Fig. 5, may comprise an activator element of opposite conductivity type than that of wafer 25 and may be fused to and diffused into a surface of the wafer to provide the P–N junction. In such gold impregnated P–N junction devices, the impedance of the junction 36 in the direction of difficult current flow varies in accord with the intensity of impinging light at temperatures above about −100° C. while the general conductivity of the gold-impregnated germanium varies with light intensity at temperatures below about −100° C. If wafer 25 is P-type, and cell 20 is intended only for use at temperatures below −100° C., electrodes 26 and 27 preferably make low resistance connection and may conveniently comprise evaporated layers of an acceptor activator preferably selected from the group consisting of indium, gallium and gold that are subsequently fused with and diffused into the surface of the germanium wafer 25 by a suitable application of heat. If wafer 25 is P-type and cell 20 is intended for use also at higher temperatures extending, for example, up to room temperature, electrode layer 26*a* may be substituted for low resistance connection 26 and may comprise a donor activator preferably selected from the group consisting of antimony and arsenic fused with and diffused into the surface of wafer 25 to provide an asymmetrically conducting P–N junction 36 such as shown in Fig. 5. If wafer 25 is N-type and cell 20 is intended only for use at temperatures below −100° C., electrodes 26 and 27 preferably make low resistance connection to wafer 25 and may comprise evaporated and fused layers of a donor activator such as antimony or arsenic. If wafer 25 is N-type and cell 20 is intended for use also at higher temperatures, electrode layer 26*a* may comprise an acceptor activator preferably selected from the group consisting of indium, gallium and gold fused with and diffused into the surface of wafer 25 by a suitable application of heat to provide P–N junction 36. If gold is used as the electrode layer 26*a*, N-type wafer may not need previously to be impregnated with gold because the fusion and diffusion of the gold into the surface adjacent region of wafer 25 may provide the desired degree of gold impregnation.

Germanium wafer 25 comprises germanium impregnated with a trace of gold within the same limits as set forth above with relation to the germanium bar 17 of thermoconductive element 10. High impurity N-type or intrinsic germanium containing less than $10^{15}$ atoms of donor activator impurities is used as the base germanium material and this germanium material is impregnated with up to $10^{15}$ atoms of gold per cubic centimeter of the germanium. It is convenient to use intrinsic germanium having an initial resistivity of above 30 ohm centimeters at 25° C. as the base germanium material and impregnate this starting material with of the order of $10^{13}$ atoms of pure gold per cubic centimeter of germanium. This may be easily done by preparing a melt of this intrinsic germanium and adding from 5 to 10 milligrams of pure gold per 100 grams of germanium of the melt and then growing an ingot from this gold-impregnated melt by seed crystal withdrawal therefrom. A wafer 25 cut from this grown ingot will then have the desired degree of gold impregnation. In addition, this range of gold impregnation of intrinsic germanium gives optimum response to incident light of the long infra-red wavelengths greater than 4 microns.

Figure 4:
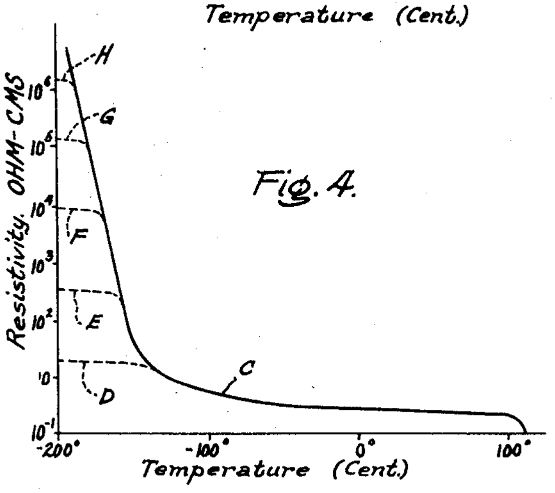
Fig. 4 is a group of curves illustrating the unusually high photoconductive properties of the device of Fig. 3.

The extent of the photoresponse in the low resistance contact type gold-impregnated germanium photoconductive cells 20 of Fig. 3 is illustrated in the curves of Fig. 4. The solid line C of Fig. 4 is a plot of the resistance versus temperature characteristic of cell 20 when completely in the dark. The broken lines D, E, F, G, and H which meet the solid curve C indicate different levels of resistivity to which the photoconductive cell 20 drops under impinging light of different light intensities. As can be seen from these curves, the photoconductive effect occurs from −100° C. to −200° C. and principally from about −140° C. to −200° C. Also, the range of resistivity level change under different light intensities is from about 10 ohms up to several megohms. Moreover, the intensity of light required to bring about a marked change in resistivity level is not very great. For example, in the case of one sample tested, at the temperature of liquid nitrogen, the resistance fell from 20 megohms in the dark to about 10,000 ohms under the light from a two-cell flashlight. An important feature of the invention also lies in the fact that these gold-impregnated photoconductive cells are also quite sensitive to light of the long infra-red wavelengths from 4 to 10 microns. Detection of such long infra-red wavelengths cannot be achieved with most conventional types of photosensitive devices.

The extent of the photoresponse in the asymmetrically conductive type gold-impregnated germanium cells of Fig. 5 is similar to that of the photoconductive cells of Fig. 3 and depends primarily upon the bulk photoconductivity of wafer 25 at low temperatures from −100° C. to −200° C. with the exception that the absolute magnitude of the impedance of the cell to current flow in the difficult flow direction while in the dark is somewhat higher. As the temperature of operation is raised above −100° C., the impedance of the asymmetrically conductive cell of Fig. 5 in the difficult flow direction remains high when in the dark but drops in accord with intensity of illumination of P–N junction 36 to an increasing degree until about room temperature is reached.

Refering now to Fig. 6, there is disclosed another embodiment of the invention in the form of a rectifier 30 comprising a germanium crystalline wafer 31 and a pair of connections 32 and 33 to opposite major surfaces of wafer 31. Germanium wafer 31 is preferably monocrystalline and may conveniently be ¼ inch long and wide and about 40 mils thick. Germanium wafer 31 consists of high purity crystalline N-type germanium having a substantially constant resistivity over a temperature range from 0° C. to 70° C. as a result of the addition of a trace of gold therein to an extent more fully described hereinafter. Electrode 32 constitutes an acceptor activator for germanium, such as indium, which is fused to and within a surface adjacent region of N-type germanium wafer 31 to form a P–N junction 34 therewith in accord with the techniques more fully described in my pending patent application, Serial No. 187,490, filed on June 15, 1951, and assigned to the same assignee as the present invention. Electrode 33 may comprise any conductive metal, but preferably consists of a donor activator element for germanium, such as antimony, which is fused to and within an opposite surface adjacent region of wafer 31. In accord with the invention, germanium wafer 31 consists of high purity N-type germanium impregnated with gold to the extent of approximately $1 \times 10^{14}$ atoms of gold per cubic centimeter of germanium for each 0.1 unit of room temperature (25° C.) conductivity thereof. By high purity N-type germanium is meant germanium having a resistivity before the addition of gold therein of above 1 ohm centimeter corresponding to the presence of no more than $1\times10^{15}$ atoms of donor activator impurity elements per cubic centimeter of germanium. Conductivity, of course, is the reciprocal of resistivity, and germanium having a conductivity of 0.1 unit (mhos per centimeter) corresponds to germanium having a resistivity of 10 ohm centimeters. In accord with the above relation, therefore, N-type germanium having a room temperature resistivity of 10 ohm centimeters requires the addition of approximately $1\times10^{14}$ atoms of gold to produce substantially constant resistivity of the germanium body from 0° C. to 70° C. Similarly, in accord with the above relation, N-type germanium initially having a room temperature conductivity of 0.05, corresponding to a resistivity of 20 ohm centimeters, requires the addition of about $0.5\times10^{14}$ atoms of gold to provide constant resistivity over the above-mentioned ambient temperature range, while an N-type germanium body initially having a room temperature conductivity of 0.2 unit, corresponding to a resistivity of 5 ohm centimeters, requires about $2\times10^{14}$ atoms of gold to achieve the desired constant resistivity characteristic over the above-mentioned ambient operating temperature range. In each case, the addition of gold increases somewhat the final resistivity of the germanium body. This increase is greater with germanium initially having a considerable percentage of N-type or donor activators than with germanium initially having very few N-type or donor activators, for example, germanium having a resistivity approaching the intrinsic region. Moreover, the addition of gold is effective to achieve a constant resistivity in accord with the invention primarily with N-type germanium initially having a purity corresponding to a room temperature resistivity ranging from 1 ohm centimeter to 40 ohm centimeters.

The fact that the addition of gold to germanium tends to increase the room temperature resistivity thereof is known to the art, but the effect of the addition of gold to provide a constant resistivity characteristic is one of the discoveries upon which the present invention is based.

Figure 7:
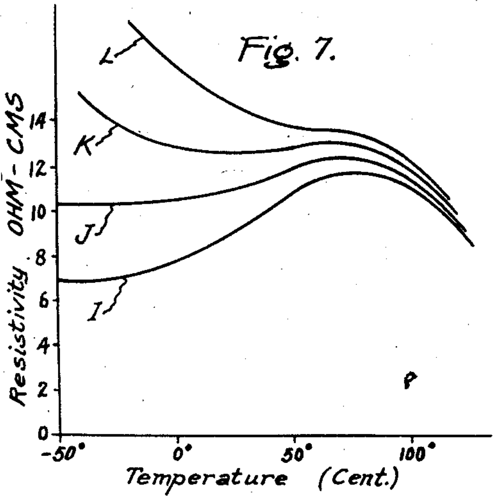
Fig. 7 is a group of curves illustrating the achievement of a constant resistivity characteristic in the germanium wafer of the rectifier of Fig. 6 over the normal operating temperature range of germanium semiconductor devices from 0° C. to 70° C. by the addition of gold therein.

The manner in which the addition of gold to N-type germanium affects the resistivity characteristics thereof over the normal operating range is illustrated by the curves of Fig. 7. In Fig. 7, curve I represents a plot of the resistivity versus temperature characteristic of an N-type germanium body having a room temperature (25° C.) resistivity of 10 ohm centimeters and extracted from a portion of an ingot grown by seed crystal withdrawal from a high purity germanium melt before gold was added to the melt. Curve J is a similar plot of the resistivity versus temperature characteristic of a germanium wafer extracted from a portion of the ingot grown from the same melt after the addition of 27 milligrams of gold per 100 grams of germanium in the melt. Curves K and L are similar plots of germanium wafers extracted from portions of the ingot grown after the melt was doped with 48 and 100 milligrams of gold per 100 grams of germanium respectively. As mentioned previously, because of the low segregation coefficient of gold relative to germanium, the addition of approximately 50 milligrams of gold per 100 grams of germanium corresponds to an impregnation in the solidified germanium body of approximately $1\times10^{14}$ atoms of gold per cubic centimeter of germanium.

As can be seen from these curves, the germanium N-type sample before the addition of gold exhibited a marked change in its resistivity characteristics from 0° C. to 70° C. The addition of even a small percentage of gold corresponding to 27 milligrams per 100 grams of germanium produced a marked improvement in the reduction of the slope of the resistivity versus temperature characteristics over this range, while the addition of 48 milligrams of gold per 100 grams of germanium, as indicated by curve K, produced a very nearly constant resistivity over the entire temperature range involved. The amount of gold that must be added to produce such constant resistivity is, of course, proportional to the initial conductivity of the germanium sample as indicated by the mathematical relations hereinbefore set forth.

It will be appreciated that, although I have described in connection with Figs. 6 and 7 the use of a germanium body having constant resistivity from 0° C. to 70° C. in connection with a rectifier 30, semiconductor bodies impregnated with gold in accord with the invention and having this constant resistivity characteristic, may be used in many other types of current control devices such as transistors and phototransistors and particularly in asymmetrically conductive devices of the P–N type such as typified by the rectifier 30 of Fig. 5.

Figure 8:
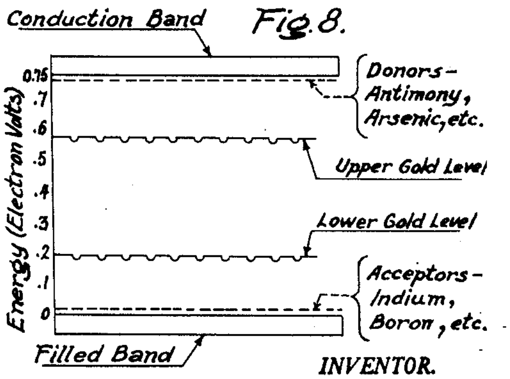
Fig. 8 is an energy level diagram of germanium impregnated with certain designated impurities.

The reason for the unusual thermoconductive, photoconductive, and resistivity stabilizing effect of gold impregnated germanium crystalline bodies is believed to be a Fermi energy level scheme for germanium such as shown in Fig. 8. As illustrated in Fig. 8, the gold impregnation induces two acceptor levels, one at about 0.20 electron volt below the conduction band and the other about 0.15 electron volt above the filled band. This is to be contrasted with the conventional acceptor materials for germanium such as indium, boron, or gallium, whose energy levels lie very close, less than 0.02 electron volt, only to the filled band, or with the conventional donor materials for germanium such as antimony or arsenic whose energy levels lie very close, less than 0.02 electron volt, only to the conduction band. The observed properties of the gold-impregnated germanium crystals may be determined by the degree to which these gold induced acceptor levels are filled by electrons from the donor impurities. It is necessary that the germanium crystal be substantially free of other acceptor activator impurities, such as indium or gallium, because such other acceptor impurities tend to short-circuit the effect of the gold due to their higher electrical activity. It is to be understood, however, that this energy level diagram is offered only for the purpose of providing a possible scientific explanation of the phenomena involved in the operation of the devices of my invention and is not to be considered to restrict the scope of the invention or to impair the validity of the claims thereto if a different explanation should ultimately prove more accurate or comprehensive.

It will also be appreciated that, although I have described specific embodiments of the invention, many modifications may be made, and I intend by the appended claims to cover all such modifications as fall within the true spirit and scope of the invention.

What I claim as new and desire to secure by Letters Patent of the United States is:

1. An electric current control device comprising a high purity germanium crystalline body having per cubic centimeter therein $10^{13}$ to $10^{15}$ atoms of gold, less than $10^{8}$ atoms of acceptor activator elements other than gold and less than $10^{15}$ atoms of donor activator elements, and a pair of electrical connections to spaced regions of said body.

2. The electric current control device of claim 1 wherein the donor activator elements are present only to the extent of about $10^{13}$ atoms per cubic centimeter of the germanium body.

3. The electric current control device of claim 1 wherein the body has P-type conductivity and the low resistance connections are selected from the group of acceptor activators consisting of indium, gallium and gold.

4. The electric current control device of claim 1 wherein the body has N-type conductivity and the low resistance connections are selected from the group of donor activators consisting of arsenic and antimony.

5. The device of claim 1 in which the germanium crystalline body is impregnated with of the order of $10^{13}$ atoms of gold per cubic centimeter, and the body is substantially free of all other impurities so as initially to constitute intrinsic germanium before the gold impregnation.

6. The electric current control device of claim 1 wherein the germanium crystalline body has N-type conductivity and is impregnated with about $1 \times 10^{14}$ atoms of gold for each 0.1 unit in mhos per centimeter of conductivity thereof.

7. An asymmetrically conductive device comprising a high purity N-type germanium crystalline body containing less than $10^{15}$ atoms of donor activator impurities and from $10^{13}$ to $10^{15}$ atoms of gold per cubic centimeter of germanium and having substantially constant resistivity over a range of temperature from 0° C. to 70° C., a rectifying connection to one region of said body, and a low resistance connection to a different region of said body.

8. An electric current control device comprising a high purity germanium crystalline body containing less than $10^{15}$ atoms of donor activator impurities per cubic centimeter thereof and having a resistivity above 1 ohm-centimeter at 25° C., said body having at least a portion thereof impregnated with from $10^{13}$ to $10^{15}$ atoms of gold per cubic centimeter and being substantially free of acceptor impurity elements other than gold, and a pair of electrical connections to spaced regions of said body.

9. Low temperature control apparatus comprising a high purity germanium crystalline body containing less than $10^{15}$ atoms of donor activator impurities per cubic centimeter thereof impregnated with $10^{13}$ to $10^{15}$ atoms of gold per cubic centimeter of germanium, means for delivering an electric current through said body and means for maintaining said body at temperatures from −100° C to −200° C., said gold impregnated germanium body exhibiting a high degree of change of conductivity with temperature over said temperature range.

10. Low temperature control apparatus comprising a high purity germanium body containing less than $10^{15}$ atoms of donor activator impurities per cubic centimeter thereof impregnated with $10^{13}$ to $10^{15}$ atoms of gold per cubic centimeter of germanium and substantially free of all other acceptor activator elements for germanium, means for delivering an electric current through said body and means for maintaining said body at temperatures from −100 C. to −200° C., said gold impregnated body exhibiting a high degree of change of conductivity with changes of light intensity over said temperature range.

11. A photosensitive control device comprising a germanium crystalline body containing less than $10^{15}$ atoms of donor activator impurities per cubic centimeter thereof and having a resistivity above 1 ohm centimeter at 25° C., said body being impregnated with from $10^{13}$ to $10^{15}$ atoms of gold per cubic centimeter of germanium and being substantially free of other acceptor activator elements for germanium, said body exhibiting a substantial decrease in resistivity for a small increase in the intensity of incident light, and a pair of electrode connections to spaced regions of said body, at least one of said electrodes making low resistance connections to said body.

12. The photosensitive device of claim 11 wherein the germanium body comprises a flat wafer and the electrode connections comprise metallic layers fused to opposite major surfaces of the wafer, one of said layers having a thickness of less than 0.001 inch to enable the passage of light therethrough.

13. A photocontrol device useful over a wide temperature range comprising a high purity germanium crystalline body containing less than $10^{15}$ atoms of donor activator impurities per cubic centimeter thereof and containing a P-type region adjoining an N-type region to form a P–N junction therewith, said P–N junction being formed adjacent a surface of said body to enable the impingement of light thereon, said P-type region being impregnated with $10^{13}$ to $10^{15}$ atoms of gold per cubic centimeter of germanium and being substantially free of other acceptor activator elements for germanium, and separate electrode connections to said P-type and N-type regions respectively.

References Cited in the file of this patent

UNITED STATES PATENTS

| | | |
|---|---|---|
| 2,189,122 | Andrews | Feb. 6, 1940 |
| 2,504,628 | Benzer | Apr. 18, 1950 |
| 2,514,879 | Lark-Horovitz | July 11, 1950 |
| 2,547,173 | Rittner | Apr. 3,1951 |
| 2,561,411 | Pfann | July 24, 1951 |
| 2,597,028 | Pfann | May 20, 1952 |
| 2,600,997 | Lark-Horovitz | June 17, 1952 |
| 2,671,154 | Burstein | Mar. 2, 1954 |
| 2,672,528 | Shockley | Mar. 16, 1954 |

OTHER REFERENCES

Electrical Engineering, December 1949, Conductivity in Semiconductors, by K. Lark-Horovitz, pages 1047 to 1055.

Electrical Engineering, July 1952, The ABC's of Germanium, by J. P. Jordan, pp. 619 to 625.

Kaiser et al.: Physical Review, March 1, 1954, vol. 93, No. 5, page 977.